United States Patent Office 3,086,010
Patented Apr. 16, 1963

3,086,010
CARBAMIDE ESTERS OF SUGARS
Georg Matthaeus, Leverkusen, and Mathieu Quaedvlieg, Leverkusen-Bayerwerk, Germany, assignors to Farbenfabriken Bayer Aktiengesellschaft, Leverkusen, Germany, a corporation of Germany
No Drawing. Filed July 24, 1958, Ser. No. 750,593
Claims priority, application Germany July 26, 1957
4 Claims. (Cl. 260—234)

The present invention relates to carbamide esters of sugars and to a process of producing the same. The process of the invention consists in reacting sugars or their derivatives which contain reactive hydroxyl groups with alkyl isocyanates which contain more than 8 carbon atoms in the alkyl residue, preferably alkyl monoisocyanates of the type of stearyl isocyanate. The carbamide esters obtainable in this way possess valuable surface active properties and can be applied as washing agents or as softening agents for textile materials and also especially as antifoaming agents.

As examples of sugars, sucrose, maltose, lactose and raffinose may be mentioned.

The reaction of the sugars or their derivatives which contain reactive hydroxyl groups with the alkyl isocyanates is preferably carried out by heating in an indifferent solvent for example in dimethyl formamide. Suitable proportions of the reaction components may be readily determined by preliminary experiments; if sugars are to be produced which only contain one alkyl carbamide residue, the sugar component is preferably used in excess, whereas if sugar esters are to be produced containing two or more alkyl carbamide residues, the components are used in molar proportions; in cases where sugar derivatives which contain reactive hydroxyl groups are to be reacted with the alkyl isocyanates, the components are likewise preferably used in corresponding molar proportions.

Compared with the known sugar esters which are produced by reacting sugars with fatty acids or with esters of fatty acids and lower molecular weight alcohols, the carbamide esters of the present invention show a stronger surface activity.

The following examples serve to illustrate the present invention without, however limiting the scope thereof; the parts given are by weight.

Example 1

35 parts of saccharose are dissolved in 300 parts of anhydrous dimethyl formamide and heated with 60 parts of stearyl isocyanate for 1–2 hours with stirring at about 100° C. The solvent is then distilled off under reduced pressure. The saccharose stearyl carbamide diester is obtained in the theoretical yield in the form of a very weakly yellow product which may be used as an antifoaming agent.

Example 2

35 parts by weight of saccharose are dissolved in 300 parts of anhydrous dimethyl formamide and heated with 89 parts of stearyl isocyanate for 1–2 hours at about 100° C. After distilling off the solvent under reduced pressure, the saccharose stearyl carbamide triester is obtained in the theoretical yield in the form of a weakly yellow product which can be used as anti-foaming agent.

Example 3

150 parts of saccharose are dissolved in 500 parts of anhydrous dimethyl formamide and heated with 30 parts of stearyl isocyanate for 1–2 hours with stirring, to about 100° C. The dimethyl formamide is then distilled off in vacuum. In the remaining residue there is found, apart from the excess sugar, the saccharose stearyl carbamide monoester with a certain proportion of higher esters. The reaction product thus obtained can be directly used as a washing agent.

Example 4

A solution of 500 parts of saccharose in 1300 parts of anhydrous dimethyl formamide is mixed with 59 parts of stearyl isocyanate at 100° C. within an hour. After the solution was heated to about 100° C. with stirring for about one hour, it is filtered and the dimethyl formamide is distilled off in vacuum. The residue contains, besides the excess of the sugar, the saccharose stearyl carbamide monoester which can be used as washing agent or as softening agent for textile materials.

Example 5

A solution of 31 parts of saccharose monostearate in 400 parts of anhydrous dimethyl formamide is mixed with 14.7 parts of stearyl isocyanate at 100–110° C. and stirred for 1 hour at this temperature. After distilling off the solvent under reduced pressure, the stearyl carbamide monoester of the saccharose monostearate is obtained in the form of an almost white powder which can be recrystallized from alcohol. The reaction product can be used as an anti-foaming agent.

We claim:
1. Surface-active esters of the formula

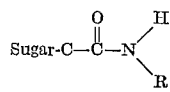

wherein R is an alkyl group containing from more than 8 and up to 18 carbon atoms and the sugar is selected from the group consisting of an unsubstituted disaccharide, an unsubstituted trisaccharide, a disaccharide esterified by a fatty acid having from more than 8 and up to 18 carbon atoms and containing at least one remaining available reactive hydroxyl group, and a trisaccharide esterified by a fatty acid having from more than 8 and up to 18 carbon atoms and containing at least one remaining reactive hydroxyl group.

2. Saccharose stearyl carbamide diester.
3. Saccharose stearyl carbamide triester.
4. Saccharose stearyl carbamide monoester.

References Cited in the file of this patent

UNITED STATES PATENTS

| | | |
|---|---|---|
| 2,527,839 | Morton | Oct. 31, 1950 |
| 2,562,978 | Wolff | Aug. 7, 1951 |
| 2,602,789 | Schwartz | July 8, 1952 |
| 2,695,913 | Bloch | Nov. 30, 1954 |

OTHER REFERENCES

"Synthetic Organic Chemistry," by Wagner et al., p. 645 (1953), John Wiley and Sons, Inc., N.Y.